(12) United States Patent
Yoda (10) Patent No.: US 7,602,519 B2
(45) Date of Patent: Oct. 13, 2009

(54) INFORMATION CONVEYANCE SYSTEM AND PRINTING MEDIUM HAVING IC CHIPS

(75) Inventor: Akira Yoda, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 930 days.

(21) Appl. No.: 10/368,360

(22) Filed: Feb. 20, 2003

(65) Prior Publication Data

US 2003/0164974 A1   Sep. 4, 2003

(30) Foreign Application Priority Data

Feb. 20, 2002   (JP) .............................. 2002-042699

(51) Int. Cl.
*G06K 15/00*   (2006.01)
*G06F 3/12*   (2006.01)
*H04N 1/00*   (2006.01)

(52) U.S. Cl. ...................... 358/1.16; 358/1.15; 358/403

(58) Field of Classification Search ................ 358/1.15, 358/1.16, 403
See application file for complete search history.

(56) References Cited

U.S. PATENT DOCUMENTS 5,640,003 A   6/1997   Makino 6,934,043 B1   8/2005   Sugiyama et al.
2002/0105677 A1 *   8/2002   Sato .......................... 358/1.15

FOREIGN PATENT DOCUMENTS

| JP | 08-036625 | 2/1996 |
| JP | 2000-020664 | 1/2000 |
| JP | 2000-122224 | 4/2000 |
| JP | 2000-127551 | 5/2000 |
| JP | 2000-285203 A | 10/2000 |
| JP | 2001-256462 | 9/2001 |
| JP | 2001-273226 A | 10/2001 |
| JP | 2002-007626 | 1/2002 |
| JP | 2002-032723 | 1/2002 |
| WO | WO 0173539 A1 * | 10/2001 |

* cited by examiner

*Primary Examiner*—Edward L Coles
*Assistant Examiner*—Thomas J Lett
(74) *Attorney, Agent, or Firm*—Sughrue Mion, PLLC

(57) ABSTRACT

Additional information of visual information printed on a printing medium can be stored in a large volume and can be provided easily. A photograph is printed on a photograph printing paper roll embedded with an IC chip having unique ID. A Web server stores additional information of the photograph in relation to the unique ID, and the URL address of the Web server is written in a ROM of the IC chip. The URL address sent from a transmission unit of the IC chip is received by a terminal, and the terminal accesses the server based on the URL address to obtain the additional information.

9 Claims, 3 Drawing Sheets

FIG.1

INFORMATION CONVEYANCE SYSTEM AND PRINTING MEDIUM HAVING IC CHIPS

BACKGROUND OF THE INVENTION

1. Field of the Invention

The present invention relates to an information conveyance system and a microchip-embedded printing medium used in the information conveyance system.

2. Description of the Related Art

As a method of conveying information, visual information has conventionally been distributed by being printed on a printing medium such as paper. Since this information conveyance method wherein visual information is printed on a printing medium is intuitive, this method has been used mainly in the fields of photography and the like. However, this method has some drawbacks. For example, forgery is easy and a printing medium tends to be degraded easily. In addition, the type and an amount of information are limited. Furthermore, only visually unimpaired people can use information conveyed by this method, and security is not sufficiently high since anybody with normal vision can see the information. In order to overcome these drawbacks, a method of conveying information by recording the information in an IC chip has been proposed (see Japanese Unexamined Patent Publication No. 2000-285203), since microchips are being put in to practice with development of a technology to down size IC chips. In this method, a printing medium (such as cloth or paper) embedded with a non-contact IC chip is used for printing visual information thereon. At the same time, information that is necessary for a purpose and usage (such as a sound, an image, and text) and related to the visual information is recorded in the IC chip to be conveyed. A recipient of the information can read the information recorded in the IC chip by using a reading apparatus such as an IC reader.

However, capacity of a non-contact IC chip capable of being embedded in a printing medium is 1024 bits at most. Therefore, it is difficult for audio information and image information to be recorded therein, and the above-described information conveyance method using the printing medium embedded with an IC chip has hardly been put into practice.

Furthermore, for a recipient of the information, it is troublesome that he/she needs a dedicated reading device (such as an IC reader) for reproducing the information recorded in the IC chip.

Moreover, in the field of photography, if a photograph is printed on a photographic printing medium embedded with an IC chip while information is recorded in the IC chip by an IC writer or the like, the time necessary for writing the information and data compression becomes long. Therefore, completion of photograph generation is delayed.

Meanwhile, digital information obtained by a digital camera or a digital camcorder is recorded in a flash memory card such as Compact Flash (CF) and Smart Media (SSFDC) that is light and small. However, flash memory cards are expensive, and not suitable for long-term image storage, unlike a negative film for a silver-salt film camera. Therefore, a user either deletes an image file from a flash memory card or moves the image files for storage in a hard disc of his/her personal computer or in a data storage server in a laboratory, after printing the image files in the card. However, an image file obtained by a digital camera or a digital camcorder includes other information, in addition to a photograph image (an image to be printed). For example, the information includes tag information that is useful for image processing at the time of printing, and moving image information for serial photography or for a movie. Therefore, if the image file is deleted after printing of the image, the information is also deleted. In the method of storing an image file by moving the image file in a hard disc of a personal computer, necessity of the computer significantly diminishes the portability of a digital camera on a trip or the like. In the method of storing image files in a data storage server in a laboratory or the like by using a remote communication function of a camera, a user needs to access the server via a public telecommunication line or the like, in order to search for a desired one of the image files in the server. Thereafter, the user also needs to carry out complex operations such as user authentication and search for a desired one of the files. In the case where a plurality of image files are stored in a plurality of servers, a user needs to carry out more complex operations for management of a relationship between a printed photograph and a corresponding one of the image files, relationships between the image files and the servers, and the addresses of the servers.

SUMMARY OF THE INVENTION

The present invention has been conceived based on consideration of the above circumstances. An object of the present invention is therefore to provide an information conveyance system that can print visual information, store and provide additional information regarding the visual information, and allow an easy access thereto, and a microchip-embedded printing medium used in the information conveyance system.

An information conveyance system of the present invention comprises:

printing means for printing visual information on a printing medium embedded with an IC chip that has a unique ID;

ID reading means for reading the ID of the IC chip;

output means for outputting to a server the ID that has been read and additional information of the visual information while relating the ID to the additional information; and the server that can store the additional information in relation to the ID output from the output means and can provide the additional information in response to an access request from a terminal for accessing the additional information corresponding to the ID. The information conveyance system is characterized in that the IC chip has a storage unit and a transmission unit in addition to the unique ID. The storage unit stores access information corresponding to the ID and used for accessing the server, while the transmission unit can send the access information to the terminal.

The IC chip refers to a non-contact IC chip that can be embedded in a printing medium such as paper and cloth.

The IC chip that has a unique ID refers to an IC chip wherein the unique ID has been written in a manufacturing process of the IC chip, before the IC chip reaches the system of the present invention, for example.

The additional information refers to any information that is deemed to be necessary. The additional information includes not only information that is related directly to the visual information but also information that is not directly related there to. The additional information can be of any type, such as text information, image information, audio information, and moving image information.

An apparatus that can write information in the IC chip, such as an IC writer, may comprise the information conveyance system of the present invention so that the access information to the server can be written in the IC chip by the writing apparatus at the time of printing by the printing means. If the writing apparatus is used, the access information to the server may be written in the IC chip before the IC chip is used by the information conveyance system of the present invention.

In the information conveyance system of the present invention, it is preferable for the server to comprise access notification means for notifying the terminal requesting an access to the additional information of the fact that an access has already been made to the additional information, in the case where the server receives the access request to the additional information that has already been accessed.

The access information refers to information necessary for accessing the server, such as the address (the URL, for example) of the server corresponding to the unique ID of the IC chip, or a phone number of an automatic audio response server.

It is preferable for the terminal that receives the access information from the IC chip to comprise access notification means for notifying an operator of the terminal of the fact that the additional information has been accessed, in the case where the terminal receives from the IC chip the access information for accessing the additional information that has already been accessed.

In the information conveyance system of the present invention, an operator of the terminal may operate the terminal so as to access the server, based on the access information received from the IC chip. Alternatively, the terminal may comprise an IC reader for reading the access information from the IC chip and access means for accessing the server in response to the access information read from the IC chip. In this case, the terminal accesses the server automatically without involving an operator. The access means may be a program or a module that is installed in the terminal and accesses the server in response to reception of the access information from the IC chip.

It is preferable for the terminal to further comprise access prohibition means that can inactivate the access means when the terminal receives from the IC chip the access information to the additional information that has already been accessed.

The terminal preferably has transmission interruption means that can interrupt an operation of the transmission unit of the IC chip, based on a transmission interruption instruction.

The transmission interruption means refers to means that can interrupt a transmission operation of the transmission unit in the IC chip, and an IC writer or the like can be used as the transmission interruption means.

The transmission interruption instruction can be anything that can interrupt the transmission operation of the transmission unit in the IC chip according to a rule in the information conveyance system of the present invention. The transmission interruption instruction may be an action of intentionally starting the IC writer or the fact that the access information has already been received once from the IC chip.

A microchip-embedded printing medium of the present invention is a printing medium having an IC chip embedded in a base material thereof, wherein the IC chip has a unique ID and comprises:

a storage unit for storing access information to the server used in the information conveyance system defined above; and a transmission unit that can transmit the access information to a predetermined terminal.

By using a photograph as the visual information and by using photograph printing means as the printing means, the information conveyance system of the present invention can be applied to a photograph printing system.

It is preferable for the photograph to be obtained by a digital camera. In this case, it is also preferable for the additional information to include accompanying information of the photograph that is attached to the photograph by the digital camera.

The digital camera refers to a camera that obtains a photographed image as digital data. The digital camera includes an ordinary digital camera for obtaining a still image and a digital camcorder that can record a moving image and a movie.

A photograph printing paper roll of the present invention is a photograph printing paper roll having IC chips embedded in a paper base material thereof. The photo graph printing paper roll is embedded with the IC chips in a density of at least one chip per an area of an L-size print. Each of the IC chips has unique ID, and comprises:

a storage unit that can store access information to the server in the information conveyance system in which the visual information are photographs, and the printing means is a photographic printer; and a transmission unit that can transmit the access information to a predetermined terminal.

Each of the IC chips used in the photograph printing paper roll of the present invention is preferably coated with at least one coating layer that can reduce permeability of a solution used for photograph printing.

It is also preferable for the photograph printing paper roll of the present invention to comprise transmission control means that is installed for each of the IC chips and can start or stop the transmission unit of a corresponding one of the IC chips.

The transmission control means may be formed by a solar cell and light shutting means.

It is preferable for each of the IC chips in the photograph printing paper roll of the present invention to be coated with a diffusive white coating material. It is desirable for each of the IC chips to be coated with the white coating material having a spectral reflectance that is substantially the same as the spectral reflectance of the paper base material. In this case, it is also preferable for a surface of each of the IC chips to be made uneven.

It is preferable for a longer side of each of the IC chips to be aligned substantially parallel with a longitudinal axis of the paper roll. In this case, it is also preferable for each of the IC chips to have an arcuate surface shape.

The microchip-embedded printing medium or the microchip-embedded photograph printing paper roll of the present invention preferably has a waterproof layer on a surface thereof.

According to the information conveyance system of the present invention, the visual information is printed on the printing medium embedded with the IC chip having the unique ID, and the additional information of the visual information is stored in the server while being related to the unique ID of the IC chip. The server can be accessed by the terminal when the transmission unit of the IC chip transmits the access information used for accessing the server that stores the additional information to the terminal owned by a recipient, that is, to the terminal owned by a person who receives the printing medium on which the visual information has been printed, for example. Therefore, the IC chip stores only the unique ID and the access information to the server. Consequently, the storage unit does not need to have a large capacity. Furthermore, since the access information to the server that stores the additional information is sent to the terminal, the recipient can access the additional information of the visual information printed on the printing medium, by only carrying out an access operation according to the access information. Therefore, in order to obtain the additional information, the recipient needs neither to manage the address of the server nor to carry out a complex operation of searching for the additional information of the visual information he/she desires.

The access information is sent from the IC chip. Therefore, the terminal can obtain the access information without a specific reading apparatus such as an IC reader.

The server in the information conveyance system of the present invention may comprise the access notification means for notifying the terminal requesting an access to the additional information that has been accessed of the fact that the additional information has already been accessed. Therefore, the recipient can understand a state of access to the additional information. Furthermore, an owner of the printing medium having the visual information printed thereon can understand whether or not a third person has accessed the additional information, in the case where the owner has provided the printing medium to the third person, for example.

If the terminal in the information conveyance system of the present invention comprises the access notification means and can notify an operator of the terminal requesting an access to the additional information of the fact that the additional information has been accessed, the recipient who is usually the operator of the terminal can avoid repetitive accesses to the additional information.

If the terminal in the information conveyance system of the present invention comprises the IC reader for inputting the access information to the terminal by reading the access information from the IC chip and the access means for accessing the server according to the access information input from the IC reader, the recipient can access the server without carrying out an operation therefor, which is more convenient for the recipient.

If the terminal having the IC reader and the access means further comprises the access prohibition means for not activating the access means in the case where the access information regarding the additional information that has already been accessed is received, the access means can be automatically prevented from being activated even if the terminal receives the access information regarding the additional information that has already been accessed. Therefore, repetitive accesses to the additional information can be avoided without an operation by an operator of the terminal.

If the terminal comprises the transmission interruption means for interrupting the operation of the transmission unit of the IC chip, the operation of the transmission unit can be interrupted according to an intention of an operator of the terminal. Furthermore, the information conveyance system can automatically stop the operation of the transmission unit of the IC chip in the case where the access information from the IC chip has been received once. Therefore, the terminal can be prevented from receiving the access information repeatedly from the IC chip, and the power provided to the IC chip can be saved.

The photograph printing system that applies the information conveyance system of the present invention to photograph printing can store the additional information regarding a photograph in the server while the photograph is printed. Therefore, an information recipient, that is, a person who receives the photograph, can easily obtain the additional information regarding the photograph while viewing the photograph. Especially, in the case where a photographer requested printing and provides the photograph to a third person, the photographer can provide the additional information on the photograph as well, by simply providing the photograph.

According to the photograph printing system that prints a photograph from a digital image obtained by a digital camera as an application of the present invention, tag information or the like added to the digital image by the camera can be provided by being stored in the server, which is beneficial. At the time the digital image is printed as the photograph, some type of image processing is necessary. Therefore, if the server stores the digital image together with an image processing condition used in the image processing, the image processing condition is useful for generating an additional print or the like. Moreover, since the server can store and provide serial images obtained by a digital camera or a digital camcorder, a movie generated by printing representative images, and a moving image, the photograph printing system can generate not only an additional print but also prints of the representative images of the serial images or the moving image.

The microchip-embedded printing medium of the present invention realizes the information conveyance system of the present invention.

The microchip-embedded photograph printing paper roll of the present invention is an example of applying the printing medium having the IC chips to a photograph printing system. The microchip-embedded photograph printing paper roll enables application of the information conveyance system of the present invention to the photograph printing system that prints a photograph on a paper roll.

If the IC chips used in the photograph printing paper roll of the present invention are coated with a layer that reduces permeability of a solution used for printing a photograph, the IC chips can be prevented from being decayed due to the solution and the IC chips can last longer.

If the photograph printing paper roll of the present invention comprises the transmission control means for controlling the operation of the transmission unit for each of the IC chips, whether or not the access information from the corresponding IC chip is received can be controlled according to an intention of the recipient. Moreover, the transmission unit can be prevented from continuous activation, which leads to reduction in power consumption of the corresponding IC chip.

If the IC chips embedded in the photograph printing paper roll of the present invention are coated with the diffusive white coating material, or more preferably coated with the coating material having substantially the same spectral reflectance as the paper base material of the paper roll, the IC chips can be prevented from appearing as undesirable spots.

If the IC chips embedded in the photograph printing paper roll of the present invention have a rough surface, the IC chips can be prevented from falling off the paper roll.

If the longer side of each of the IC chips embedded in the photograph printing paper roll of the present invention is aligned in the direction substantially parallel to the axis of the paper roll, the IC chips can be prevented from being damaged, that tends to occur at the time of installation or delivery of the paper roll.

In the case where photographs are printed on a paper roll, the photographs are generally separated by being cut with a cutter or the like. However, a cutter and the IC chips in this invention may be damaged if the IC chips are in positions corresponding with the cutting portions. If the IC chips in the photograph printing paper roll of the present invention have an arcuate surface, the IC chips tend to deflect the cutter. In this manner, the cutter and the IC chips are prevented from being damaged.

If the printing medium and the photograph printing paper roll are coated with a waterproof layer, an ink and a solution for printing a silver-slat film photograph can be prevented from smearing into the printing medium and the paper roll.

Therefore, the IC chips are prevented from being decayed and further prevented from falling due to degradation of the base material.

DESCRIPTION OF THE PREFERRED EMBODIMENTS

Hereinafter, embodiments of the present invention will be explained with reference to the accompanying drawings.

Figure 1:
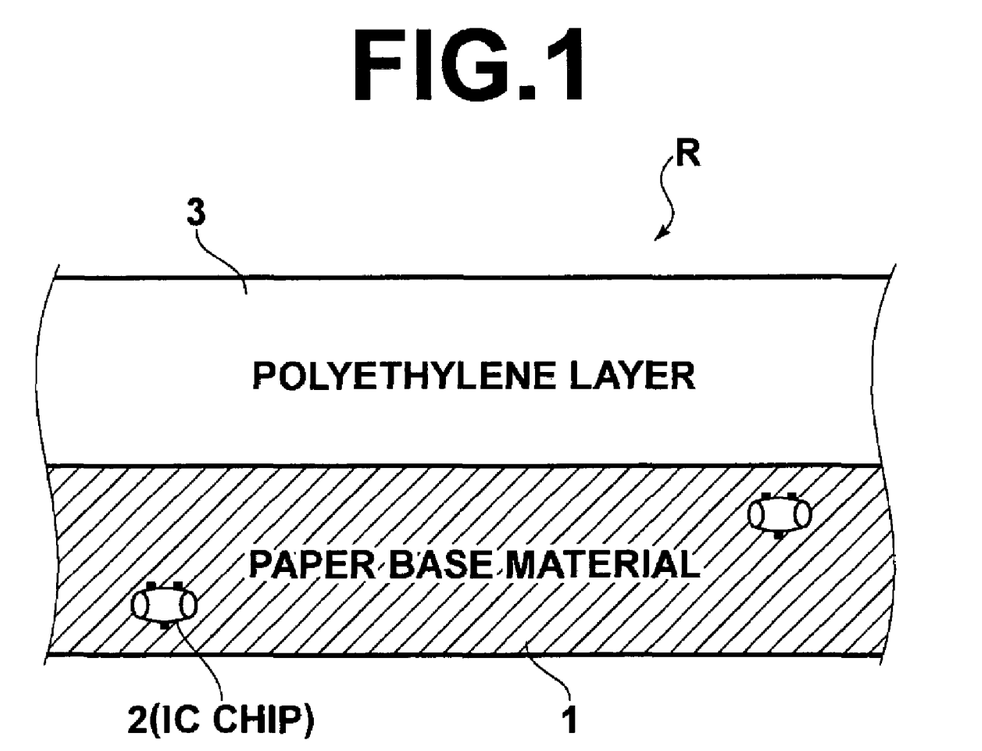
FIG. 1 is shows an embodiment of a photograph printing paper roll of the present invention.

FIG. 1 is a cross-sectional view showing a configuration of a photograph printing paper roll of an embodiment of the present invention.

As shown in FIG. 1, a photograph printing paper roll R (hereafter referred to as the paper roll R) comprises a paper base material 1 and a waterproof polyethylene layer 3 on top of the base material 1. The paper base material 1 is embedded with non-contact IC chips 2 distributed in a density of at least one chip per an area of an L-size print.

Each of the IC chips 2 stores unique ID written in a manufacturing process, which is not shown in FIG. 1. Each of the IC chips comprises a ROM in which information can be written by an IC writer, and a high-frequency analog circuit that acts as a transmission unit for transmitting information written in the ROM. A solar cell for activating the transmission unit by receiving light is also incorporated in each of the IC chips.

Each of the IC chips 2 has an arcuate surface shape and has spray-like projections for preventing a fall from the paper base material 1.

The longer side of each of the IC chips 2 is aligned in a direction that is substantially parallel to an axis of the paper roll R in order to prevent damage of the IC chips at the time of delivery or installation of the paper roll R.

Figure 2:
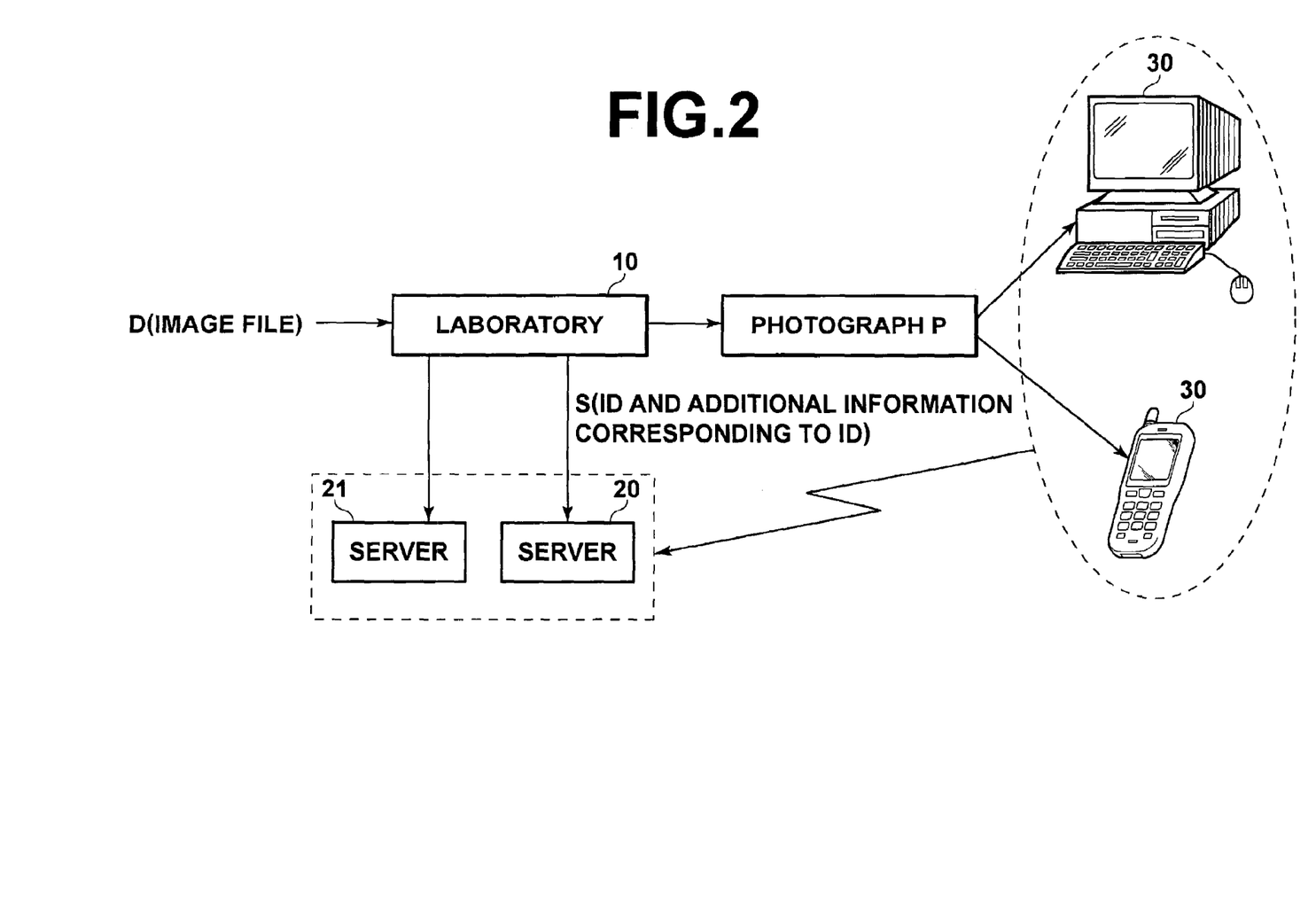
FIG. 2 shows a photograph printing system as an embodiment of an information conveyance system of the present invention.

FIG. 2 is a block diagram showing a configuration of a photograph printing system as an embodiment of an information conveyance system of the present invention.

The photograph printing system shown in FIG. 2 comprises a laboratory 10, Web servers 20 and 21, and a terminal 30 (such as a personal computer or a cellular phone). The laboratory 10 prints a photograph P, based on a digital image file D (hereinafter referred to as the image file D) obtained by a digital camera. The laboratory 10 also writes the URL address of the Web server 20 or 21 wherein additional information of the photograph P is to be stored, in the ROM of one of the IC chips 2 (hereinafter referred to as the IC chip 2) embedded in a portion of the paper roll R on which the photograph P is printed. In addition, the laboratory 10 generates the additional information on the photograph P, and outputs the additional information to the Web server 20 or 21 in relation to the ID of the IC chip 2. The Web server 20 or 21 stores the additional information sent from the laboratory 10, and provides the additional information in response to a request of an access there to. The terminal 30 receives access information sent from the IC chip 2 embedded in the photograph P, and can access the Web server 20 or 21 according to the access information.

Figure 3:
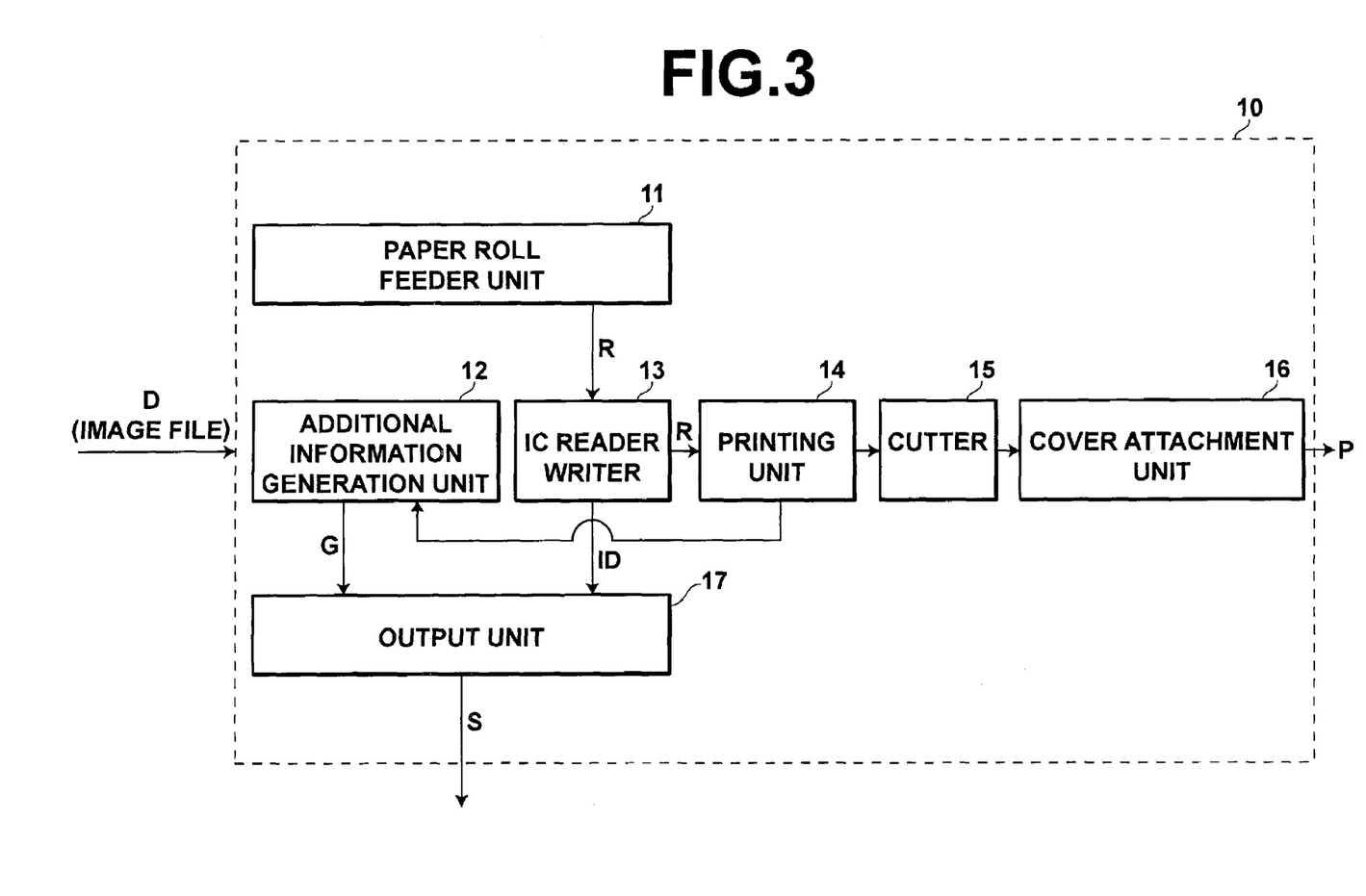
FIG. 3 shows a configuration of a laboratory in the photograph printing system shown in FIG. 2.

FIG. 3 shows a detailed configuration of the laboratory 10 in the photograph printing system shown in FIG. 2. As shown in FIG. 3, the laboratory 10 comprises the following components. A paper roll feeder unit 11 feeds the paper roll R. An IC reader writer 13 reads the ID of the IC chip 2 embedded in the portion of the paper roll R used for printing the photograph P, and writes in the IC chip 2 the URL address of the Web server 20 or 21 that stores the additional information of the photograph P. An additional information generation unit 12 generates the additional information of the photograph P by obtaining the information from the image file D or from a manual input. An output unit 17 outputs to the Web server 20 or 21 information S wherein the ID of the IC chip 2 read by the IC reader writer 13 is related to the additional information generated by the additional information generation unit 12. A printing unit 14 carries out image processing on the image file D, and prints a processed image on the paper roll R. A cutter 15 cuts the portion of the paper roll R on which the photograph P has been printed. A cover attachment unit 16 attaches a paper cover to a surface of the photograph P. An image processing condition or the like used in the image processing on the image file D is also input to the additional information generation unit 12 when the printing unit 14 prints the photograph P.

The additional information generation unit 12 generates the additional information from the image file D itself, tag information added to the image file D, the image processing condition used in the image processing on the image file D, image files obtained immediately before and after the image file D in the case of serial photography, and a movie file including the image file D in the case where the image file D represents a representative image of a movie, for example. The additional information generation unit 12 generates the additional information from any information regarding the image file D (such as a sound of waterfall in the case where the image file D represents an image of a waterfall, and a recommended menu of a restaurant in the case where the image file D represents an image of a restaurant) that is input manually if desired.

The output unit 17 outputs the additional information in relation to the ID of the IC chip 2 embedded in the base material (printing paper) of the photograph P to the Web server 20 or 21 where the additional information is stored in relation to the ID. The URL address of the Web server 20 or 21 is written in the IC chip 2 by the IC reader writer 13. The photograph P is provided to an owner thereof, after the cover attachment unit 16 attaches the paper cover thereto. Since the IC chip 2 has the solar cell incorporated therein, the transmission unit of the IC chip 2 is not activated unless the owner opens the cover. If the owner opens the cover, the solar cell in the IC chip 2 activates the transmission unit, and the URL address stored in the ROM regarding the Web server 20 or 21 that stores the additional information is sent from the transmission unit.

The owner of the photograph P receives the URL address sent from the IC chip 2 by using the terminal 30, and obtains the additional information of the photograph P by accessing the URL address with use of browser software.

As has been described above, according to the photograph printing system shown in FIG. 2, the additional information of the photograph P is stored in the Web server, instead of the IC chip 2. Therefore, regardless of the capacity of the IC chip 2, the additional information can be stored even if a size thereof is large.

Storing the additional information having a large size is extremely beneficial. For example, by storing the image file D as it is, an additional print can be generated easily from the image file without a print scanner that is necessary in the case of conventional additional-print generation. By storing the image processing condition used at the time of printing, the image processing condition does not need to be set again for additional-print generation, which can save time.

Since the additional information of the photograph P is stored in the Web server by being related to the unique ID of the IC chip 2 embedded in the portion of the paper roll R on which the photograph P is printed while the URL address of the Web server is sent from the transmission unit of the IC chip 2 to the terminal 30 of the owner of the photograph P, a user can easily obtain the additional information of the photograph P by simply accessing the Web server according to the URL address, without a complex operation such as management of the address and a search for the additional information.

Meanwhile, a laboratory generally needs to process 400 to 800 prints per hour. Therefore, fast feeding and fast printing have been carried out there in by using a photograph printing paper roll. However, in the case where information is written in an IC chip of a photograph by using an IC writer or the like during the fast processing, an interference problem occurs in some cases wherein the information is written in an IC chip of a neighboring photograph. In order to solve this problem, the photograph printing system of the present invention uses the facts that photographs to be printed serially often belong to the same person and additional information of the photographs is usually stored in the same server. By using the paper roll R having the unique ID, that is, the paper roll R on which the information for identifying the photograph P has already been written in a manufacturing process, only the access information that is highly likely to be used commonly among photographs including the photograph P is written in the ROM of the IC chip 2 at the time of printing. In this manner, fast printing can be maintained while an error due to the interference problem described above can be avoided.

Furthermore, unlike a conventional technique, the photograph printing system of the present invention transmits the access information regarding the Web server that stores the additional information from the transmission unit of the IC chip 2 of the photograph P. Therefore, the owner can obtain the additional information without a dedicated apparatus such as an IC reader for reading the access information from the IC chip.

Moreover, the IC chip 2 of the photograph printing paper roll R shown in FIG. 1 has the unique ID. Therefore, unlike a conventional system, giving identification information such as ID to a photograph by using laboratories in a hierarchical structure becomes unnecessary. In addition, the ID having a limited bit length can be used effectively.

By using the solar cell in the IC chip 2 and by covering the photograph, the transmission unit of the IC chip 2 can be prevented from being activated constantly, which can extend the life of the IC chip 2. At the same time, the owner can send the access information by activating the transmission unit only in the case where he/she needs the additional information.

The various ideas applied to the IC chip 2 in the paper roll R shown in FIG. 1, that is, the polyethylene layer as a waterproof layer, the arcuate surface shape, the spray-like projections, and alignment of the longer side of the IC chips 2 in the direction of the axis of the paper roll, can protect the base material of the paper roll, the IC chip itself, and the cutter 15. Furthermore, these ideas can prevent the IC chips 2 from falling off the paper roll.

The embodiments described above are simplified for the sake of easy understanding of the scope of the present invention. However, the information conveyance system, the printing medium, and the paper roll of the present invention are not necessarily limited to those embodiments described above, and various modifications can be made thereto.

For example, the photograph printing paper roll R shown in FIG. 1 has the waterproof layer alone. However, the surface of the IC chip 2 may be coated with a diffusive white coating material, in order to cause a finish of the photograph P to look better. In this manner, an undesirable spot in the photograph P can be prevented from appearing. If the white coating material has spectral reflectance that is the same as that of the paper base material, the finish can be improved. Moreover, in the case where the paper base material includes a fluorescent whitening agent, the surface of the IC chip 2 may be coated with the same type of agent, in order to maintain a color and evenness of the printing paper.

The photograph printing system shown in FIG. 2 prints the photograph P, based on the image file D obtained by a digital camera. However, the information conveyance system of the present invention can also be applied to a photograph printing system for silver-salt film photographs. In this case, a layer for preventing smear of a solution for printing photographs may be used on the surface of the IC chip 2.

By using the fact that each of the IC chips 2 has the unique ID, the IC chips may be distributed in a higher density on the paper roll R so that a plurality of photographs can be printed on the printing paper having a size for one photograph. In this case, the access information for the photographs is written in the IC chips corresponding to the respective photographs. In this manner, the additional information can be stored and obtained easily for each of the photographs in an index print having a plurality of photographs printed on paper having a size for one photograph, for example.

In the photograph printing system shown in FIG. 2, the Web servers 20 and 21 are used, and the access information to be sent to the terminal 30 represents the URL address of the Web server 20 or 21. However, as long as the Web servers and the access information correspond to each other, a combination thereof is not limited to the example described above. A combination of a phone number and an automatic audio response server can be adopted as the combination, for example.

The photograph printing system of the present invention may have a simple configuration as the photograph printing system shown in FIG. 2 so that the additional information is stored in the Web server in relation to the unique ID of the IC chip 2 and provided to the terminal 30 in response to an access request corresponding to the unique ID. However, some modifications may be made to the photograph printing system in FIG. 2 for improving convenience. For example, suppose that a user owns a scenery photograph taken at a trip with his/her friends. The Web server 20 or 21 stores the additional information in relation to the unique ID of the IC chip 2 of the photograph, such as the date and location of photography as well as information on camera angle in the case of a panoramic photograph. However, things related to the photograph are not limited to those described above. Therefore, depending on a desire of a photographer (a person who requested printing), an amount of the additional information can be large regarding the things such as a sound of a waterfall in the photograph, a souvenir sold at the location, famous food eaten after photography, a comment made by one of his/her friends on the scenery, and the chirp of a bird in the photograph, for example. If the large amount of additional information is related only to the unique ID, all the additional information is provided at each access thereto. Therefore, the time necessary for the access becomes long, which is rather unpleasant for a person who accesses the additional information. For this reason, if the system can narrow down the additional information in response to a combination of photograph IDs, only a desired portion of the additional information can be provided.

More specifically, when additional information C is generated for a photograph A, weights Yi (i: a natural number) representing proportions of image properties are generated for various types of information (Ga, Gb, Gc, . . . ) in the additional information G, as shown by Equation (1) below:

$$Ga(Y1, Y2, Y3, Y4, \ldots)$$
$$Gb(Y1, Y2, Y3, Y4, \ldots)$$
$$Gc(Y1, Y2, Y3, Y4, \ldots) \quad (1)$$

where Y1, Y2, Y3, and Y4 are weights for people, for nature or scenery, for food-related things, and for other things, respectively.

If the photograph A represents the scenery, the weight Y2 in panoramic image information Ga is large while the weight Y1 in human voice information Gb becomes large regarding what the friend said at the location. The weight Y3 in food information Gc becomes large on the food eaten after photography. The additional information G, including the various types of information corresponding to the unique ID of the IC chip 2 for the photograph A, is stored in the Web server while being weighted in the above manner.

When the terminal 30 accesses the Web server, if the terminal 30 requests an access to additional information of another photograph within a predetermined time period from an access to the additional information G of the photograph A, the Web server provides one of the types of information whose weight is large and which belongs to the same image property as one of the types of additional information for the other photograph whose weight is also large, among the additional information G for the photograph A. For example, if an access is requested for additional information of a photograph of a portrait whose weight Y1 for people is large within the predetermined time from an access request to the additional information G of the photograph A, the server provides what the friend said so that the type of additional information having the large weight for people can be provided among the additional information G of the photograph A. The remaining types of information maybe not provided or provided selectively in response to a desire of a user.

By providing the information having higher correlativity in the image properties, the user can intuitively access a desired one of the types of additional information, which is beneficial. If setting means is used in the terminal or in the Web server for setting whether all the additional information is provided for one access request or whether only a portion thereof is provided selectively in response to a combination of access requests for the photographs, the convenience can be improved.

The information conveyance system that can narrow down the additional information may narrow down the additional information by using the date and time of photography, the location, and a characteristic that is common among the photographs (such as high mountains), in addition to the example described above.

If the Web server has access notification means for displaying a message such as "Already Accessed" or the like when an access request to the additional information that has been accessed once is received, the owner of the photograph can understand whether or not the additional information has been accessed. For example, the owner can know whether the additional information has been seen by a third person in the case where the owner provided the photograph to the third person.

If the fact that the access has been made is notified to the owner by installing in the personal computer or the cellular phone a program that displays the message or prevents a ringing tone when the access information to the additional information that has been accessed is received, the owner can be prevented from accessing the same additional information twice.

Furthermore, the terminal 30 may comprise a writing apparatus such as an IC writer so that the operation of the transmission unit of the IC chip 2 can be interrupted upon reception of the access information from the IC chip 2 of the photograph P. In this manner, the owner can be prevented from accessing the same additional information twice, and the life of the IC chip 2, that is, the life of the photograph P, can be extended.

In the photograph printing system shown in FIG. 2, the user makes an access by starting the browser software or the like installed in the terminal, based on the access information sent from the IC chip 2 of the photograph P. However, in the information conveyance system of the present invention, the terminal 30 may access the server automatically upon reception of the access information sent from the IC chip 2. More specifically, if the terminal 30 is connected to an IC reader unit via an interface such as USB and if a program for accessing the Web server by starting the browser software based on a signal from the IC reader unit, the user only has to bring the photograph P close to the IC reader unit. The IC reader unit receives the access information stored in the IC chip 2 of the photograph P, and sends the access information to the terminal 30. The program installed in the terminal 30 is always monitoring the signal from the IC reader unit. Therefore, once the signal is received, the program immediately starts the browser software, and accesses the Web server based on the access information sent from the IC reader unit. In this manner, the additional information is obtained. In this system, the user does not need to carry out any access operation such as starting the browser software, which is convenient for the user. Furthermore, since the IC reader unit receives the access information, the transmission unit of the IC chip 2 only has to carry out close-range radio transmission, which leads to cost reduction of the IC chip 2. At the same time, the IC chip 2 does not need to transmit the access information to the terminal 30, no communication license is necessary, which is also convenient.

In the above embodiments, the photograph printing system was used as an example for explaining the present invention. However, the present invention is not limited to the photograph printing system. For example, the present invention can be applied to a book that can be used by visually impaired people as well, or to a printing system for generating printed matter that can provide not only visual information printed thereon but also additional information thereof. Furthermore, the printing medium is not necessarily limited to paper or the photograph printing paper roll R. For example, if cloth embedded with an IC chip having unique ID is used, a printing system for the apparel industry can be installed that can provide a pattern as well as additional information. Moreover, the information conveyance system of the present invention can be applied to the amusement industry. Conventionally, in a card game, game players play the game using paper cards at one location. However, by applying the information conveyance system of the present invention to the cards, a game player can play with other players located away from him/her by accessing information corresponding to the cards, if he/she purchases the cards. At the same time, since a server can provide information that is far larger than information printed on the cards, more complex games can be played.

What is claimed is:

1. An information conveyance system comprising:
   printing means for printing visual information on a printing medium embedded with an IC chip that has a unique ID;
   ID reading means for reading the ID of the IC chip;
   output means for outputting to a server the ID that has been read and additional information of the visual information while relating the ID to the additional information; and
   a server that can store the additional information in relation to the ID output from the output means and can provide the additional information in response to an access request from a terminal for accessing the additional information corresponding to the ID, wherein
   the IC chip has a storage unit that stores access information corresponding to the ID and used for accessing the server, and a transmission unit that can send the access information to the terminal, in addition to the unique ID; wherein
   said access information comprises information that specifies an address of the server corresponding to the unique ID of the IC chip, or information that specifies a phone number of an automatic audio response server, and is stored separately from the unique ID.

2. An information conveyance system as defined in claim 1, wherein the server comprises access notification means for notifying the terminal requesting an access to the additional information of the fact that an access has already been made to the additional information, in the case where the server receives the access request for the additional information that has already been accessed.

3. An information conveyance system as defined in claim 1, wherein the terminal comprises access notification means for notifying an operator of the terminal of the fact that the additional information has been accessed, in the case where the terminal receives from the IC chip the access information for accessing the additional information that has already been accessed.

4. An information conveyance system as defined in claim 1, wherein the terminal comprises:
   an IC reader for reading the access information from the IC chip; and
   access means for accessing the server corresponding to the access information read from the IC chip.

5. An information conveyance system as defined in claim 1 wherein the terminal comprises:
   an IC reader for reading the access information from the IC chip;
   access means for accessing the server corresponding to the access information read from the IC chip; and
   access prohibition means that can inactivate the access means when the terminal receives from the IC chip the access information for the additional information that has already been accessed.

6. An information conveyance system as defined in claim 1, wherein the terminal comprises transmission interruption means that can interrupt an operation of the transmission unit of the IC chip, based on a transmission interruption instruction.

7. An information conveyance system as defined in claim 1, wherein
   the visual information is a photograph; and
   the printing means is photograph printing means.

8. An information conveyance system as defined in claim 7, wherein
   the photograph is obtained by a digital camera, and
   the additional information includes accompanying information of the photograph that is attached to the photograph by the digital camera.

9. An information conveyance system as defined in claim 1, further comprising writing means for writing the access information for accessing the server corresponding to the ID of the IC chip.

* * * * *